United States Patent
Yang

(10) Patent No.: US 11,775,303 B2
(45) Date of Patent: Oct. 3, 2023

(54) COMPUTING ACCELERATOR FOR PROCESSING MULTIPLE-TYPE INSTRUCTION AND OPERATION METHOD THEREOF

(71) Applicant: Electronics and Telecommunications Research Institute, Daejeon (KR)

(72) Inventor: Jeongmin Yang, Busan (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/446,678

(22) Filed: Sep. 1, 2021

(65) Prior Publication Data

US 2022/0147353 A1    May 12, 2022

(30) Foreign Application Priority Data

Nov. 12, 2020 (KR) .................. 10-2020-0151339
Mar. 5, 2021 (KR) .................. 10-2021-0029333

(51) Int. Cl.
*G06F 9/30* (2018.01)
*G06F 9/38* (2018.01)
(Continued)

(52) U.S. Cl.
CPC ........ *G06F 9/30189* (2013.01); *G06F 9/3001* (2013.01); *G06F 9/3016* (2013.01);
(Continued)

(58) Field of Classification Search
CPC ............... G06F 9/3001; G06F 9/30189; G06F 9/30014; G06F 9/30098; G06F 9/30141;
(Continued)

(56) References Cited

U.S. PATENT DOCUMENTS 5,758,176 A * 5/1998 Agarwal ............. G06F 15/8092
712/E9.071
7,293,160 B2 * 11/2007 Chaudhry ............... G06F 9/384
712/228
(Continued)

FOREIGN PATENT DOCUMENTS

KR    10-2016-0127156    11/2016
KR    10-1996842         7/2019

OTHER PUBLICATIONS

"Machine code", <https://en.wikipedia.org/wiki/Machine_code> (Year: 2019).*
(Continued)

*Primary Examiner* — Andrew Caldwell
*Assistant Examiner* — Kasim Alli
(74) *Attorney, Agent, or Firm* — KILE PARK REED & HOUTTEMAN PLLC

(57) ABSTRACT

Disclosed is a general-purpose computing accelerator which includes a memory including an instruction cache, a first executing unit performing a first computation operation, a second executing unit performing a second computation operation, an instruction fetching unit fetching an instruction stored in the instruction cache, a decoding unit that decodes the instruction, and a state control unit controlling a path of the instruction depending on an operation state of the second executing unit. The decoding unit provides the instruction to the first executing unit when the instruction is of a first type and provides the instruction to the state control unit when the instruction is of a second type. Depending on the operation state of the second executing unit, the state control unit provides the instruction of the second type to the second executing unit or stores the instruction of the second type as a register file in the memory.

13 Claims, 8 Drawing Sheets

(51) Int. Cl.
*G06F 17/18* (2006.01)
*G06F 12/0875* (2016.01)

(52) U.S. Cl.
CPC ........ *G06F 9/3808* (2013.01); *G06F 12/0875* (2013.01); *G06F 17/18* (2013.01); *G06F 2212/452* (2013.01)

(58) Field of Classification Search
CPC .. G06F 9/30123; G06F 9/3877; G06F 9/3885; G06F 9/5044; G06F 17/16; G06F 9/30101; G06F 9/30145; G06F 9/3836; G06F 9/3867
See application file for complete search history.

(56) References Cited

U.S. PATENT DOCUMENTS

| | | | |
|---|---|---|---|
| 8,020,169 B2* | 9/2011 | Yamasaki | G06F 9/3009 712/228 |
| 8,055,886 B2* | 11/2011 | Tashiro | G06F 9/30065 712/241 |
| 8,074,056 B1 | 12/2011 | Chen et al. | |
| 8,667,049 B2 | 3/2014 | Blumrich et al. | |
| 10,095,521 B2 | 10/2018 | Ben-Kiki et al. | |
| 2007/0083742 A1* | 4/2007 | Abernathy | G06F 9/3836 712/244 |
| 2010/0180100 A1* | 7/2010 | Lu | G06F 9/30032 712/32 |
| 2019/0079801 A1 | 3/2019 | Lyuh et al. | |
| 2019/0164036 A1 | 5/2019 | Kim | |
| 2021/0089317 A1* | 3/2021 | Liu | G06F 9/3836 |

OTHER PUBLICATIONS

"Register file", <https://en.wikipedia.org/wiki/Register_file> (Year: 2019).*

* cited by examiner

COMPUTING ACCELERATOR FOR PROCESSING MULTIPLE-TYPE INSTRUCTION AND OPERATION METHOD THEREOF

CROSS-REFERENCE TO RELATED APPLICATIONS

This application claims priority under 35 U.S.C. § 119 to Korean Patent Application Nos. 10-2020-0151339 filed on Nov. 12, 2020 and 10-2021-0029333 filed on Mar. 5, 2021, in the Korean Intellectual Property Office, the disclosures of which are incorporated by reference herein in their entireties.

BACKGROUND

The present disclosure relates to a computing system, and more particularly, relates to a general-purpose computing accelerator and an operation method thereof.

A conventional super computer system has been used to secure a computing capability of a company and build a large-scale data center, but a recent super computer system is being implemented for a national infrastructure project.

A super computer is implemented by a combination of a plurality of central processing units and a plurality of graphics processing units. However, as the scale of the super computer is expanded to an exa-scale unit and various functions are required, there is a limitation on the scalability and versatility of the super computer implemented by an existing CPU and GPU combination.

SUMMARY

Embodiments of the present disclosure provide a general-purpose computing accelerator with improved scalability and improved versatility and an operation method thereof.

According to an embodiment, a general-purpose computing accelerator includes a memory that includes an instruction cache, a first executing unit that performs a first computation operation, a second executing unit that performs a second computation operation, an instruction fetching unit that fetches an instruction stored in the instruction cache, a decoding unit that decodes the instruction, and a state control unit that controls a path of the instruction depending on an operation state of the second executing unit. The decoding unit provides the instruction to the first executing unit when the instruction is of a first type and provides the instruction to the state control unit when the instruction is of a second type. Depending on the operation state of the second executing unit, the state control unit provides the instruction of the second type to the second executing unit or stores the instruction of the second type as a register file in the memory.

In an embodiment, the first executing unit includes at least one arithmetic logic unit that performs an arithmetic operation or a logic operation, and at least one floating point calculating unit that performs a floating point operation.

In an embodiment, the second executing unit includes a multi-precision arithmetic logic unit that includes a plurality of floating point operators configured to perform a matrix operation, and an extended cache direct memory access unit that moves matrix data from an external memory to an extended cache of the memory.

In an embodiment, when the matrix data are stored in the memory by the extended cache direct memory access unit and an operation of the multi-precision arithmetic logic unit is possible, the state control unit provides the instruction of the second type to the multi-precision arithmetic logic unit, and the multi-precision arithmetic logic unit performs a matrix operation on the matrix data in response to the instruction of the second type.

In an embodiment, when the matrix data are stored in the memory by the extended cache direct memory access unit and the multi-precision arithmetic logic unit is operating, the state control unit stores the instruction of the second type as the register file in the memory.

In an embodiment, when the matrix data are not yet stored in the memory by the extended cache direct memory access unit, the state control unit provides the instruction of the second type to the extended cache direct memory access unit. In response to the instruction of the second type, the extended cache direct memory access unit moves the matrix data from the external memory to the extended cache of the memory and writes the instruction of the second type as the register file in the memory.

In an embodiment, the instruction fetching unit fetches the instruction from the instruction cache based on a program counter.

In an embodiment, after the instruction of the second type is stored in the memory as the register file, under control of the state control unit, the instruction fetching unit fetches the instruction of the second type from the register file of the memory, the decoding unit decodes the instruction of the second type, and the instruction of the second type thus decoded is executed by the second executing unit.

In an embodiment, the state control unit includes a determiner that generates a first ready signal and a second ready signal based on the operation state of the second executing unit, a first selector that provides the instruction fetching unit with one of an instruction stored in the instruction cache and an instruction stored in the register file in response to the first ready signal, and a second selector that provides one of the second executing unit and the memory with the instruction of the second type in response to the second ready signal.

In an embodiment, a result of the first computation operation of the first executing unit is stored in the memory, and a result of the second computation operation of the second executing unit is stored in the memory.

In an embodiment, the general-purpose computing accelerator is implemented with a single core.

According to an embodiment, an operation method of a general-purpose computing accelerator which includes a first executing unit configured to perform a first computation operation and a second executing unit configured to perform a second computation operation includes fetching an instruction from a memory of the general-purpose computing accelerator, based on a program counter, when the instruction is of a first type, executing the instruction of the first type through the first executing unit, and, when the instruction is of a second type, based on an operation state of the second executing unit, executing the instruction of the second type through the second executing unit or storing the instruction of the second type as a register file in the memory. The first computation operation includes an arithmetic logic operation or a floating point operation, and the second computation operation includes a matrix operation.

In an embodiment, the executing of the instruction of the second type through the second executing unit or the storing of the instruction of the second type as the register file in the memory, based on the operation state of the second executing unit, when the instruction is of the second type includes, moving the matrix data from an external memory to the memory and storing the instruction of the second type as the register file in the memory when matrix data corresponding to the instruction of the second type is not ready in the memory, storing the instruction of the second type as the register file in the memory when the matrix data corresponding to the instruction of the second type is ready in the memory and the second executing unit is incapable of operating, and executing the instruction of the second type through the second executing unit when the matrix data corresponding to the instruction of the second type is ready in the memory and the second executing unit is capable of operating.

In an embodiment, the method further include, after the instruction of the second type is stored in the memory as the register file, fetching the instruction of the second type from the register file of the memory, and executing the instruction of the second type through the second executing unit.

In an embodiment, a result of the first computation operation of the first executing unit and a result of the second computation operation of the second executing unit are stored in the memory.

BRIEF DESCRIPTION OF THE FIGURES

The above and other objects and features of the present disclosure will become apparent by describing in detail embodiments thereof with reference to the accompanying drawings.

DETAILED DESCRIPTION

Below, embodiments of the present disclosure will be described in detail and clearly to such an extent that one skilled in the art easily carries out the present disclosure.

Below, the terms "unit", "module", etc. used herein and function blocks illustrated in drawings may be implemented with various hardware devices, such as an integrated circuit, an application specific IC (ASIC), a field programmable gate array (FPGA), and a complex programmable logic device (CPLD), firmware driven in hardware devices, software such as an application, or a combination of a hardware device and software. Also, the blocks may include circuits implemented with semiconductor elements in an integrated circuit, or circuits enrolled as an intellectual property (IP).

Figure 1:
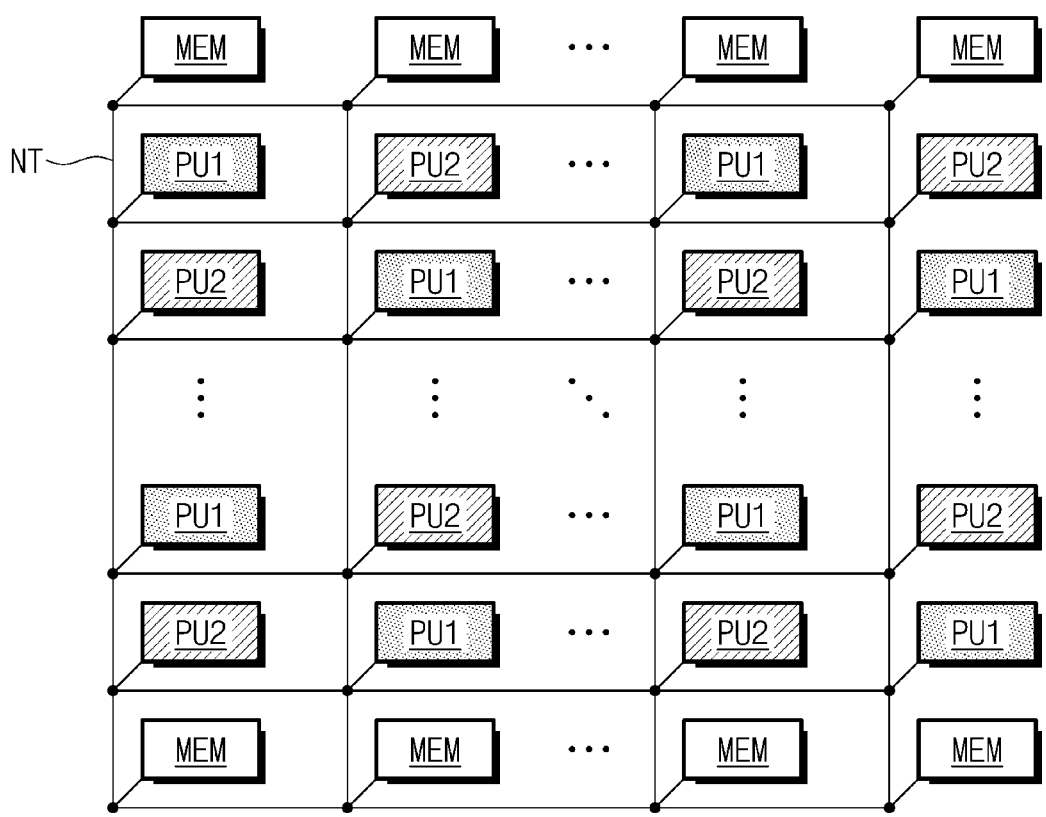
FIG. 1 is a block diagram illustrating a computing system.

FIG. 1 is a block diagram illustrating a computing system. Referring to FIG. 1, a computing system 10 may include a plurality of memories MEM, a plurality of first processing units PU1, a plurality of second processing units PU2, and a network NT. In an embodiment, the computing system 10 may be a super computer system that is used in various fields including science and technology computation. However, the present disclosure is not limited thereto. For example, the computing system 10 may include various kinds of computing systems configured to support various computation functions.

The plurality of memories MEM may be configured to store data that are used in the plurality of first processing units PU1 and the plurality of second processing units PU2, or data that are generated by the first processing units PU1 and the plurality of second processing units PU2. The plurality of memories MEM may be implemented with at least one of various kinds of memories such as a dynamic random access memory (DRAM), a static random access memory (SRAM), a flash memory, a phase change RAM (PRAM), a magnetic RAM (MRAM), a resistive RAM (ReRAM), and a ferroelectric RAM (FRAM).

Each of the plurality of first processing units PU1 and the plurality of second processing units PU2 may be a unit operator, a unit processor, or a unit core configured to perform unit computation. The plurality of first processing units PU1 may be configured to perform various operations that are required by the computing system 10. In an embodiment, each of the plurality of first processing units PU1 may be a central processing unit (CPU) that is one of basic units of the computing system 10. The plurality of second processing units PU2 may be configured to perform various operations that are required by the computing system 10. In an embodiment, each of the plurality of second processing units PU2 may a graphics processing unit or an accelerator for parallel computation of the computing system 10.

The plurality of memories MEM, the plurality of first processing units PU1, and the plurality of second processing units PU2 may be connected over the network NT. The plurality of first processing units PU1 and the plurality of second processing units PU2 may be cross-arranged adjacent to each other as illustrated in FIG. 1. For example, the plurality of first processing units PU1 and the plurality of second processing units PU2 may be arranged alternately in a row direction and a column direction. This arrangement is for the efficiency of computation parallelization and distributed processing of the computing system 10.

In an embodiment, the plurality of first processing units PU1 and the plurality of second processing units PU2 have independent computing systems and are configured to process different types of operations. Because each of the plurality of first processing units PU1 and the plurality of second processing units PU2 has a given computing system, there is a limitation on the versatility through the plurality of first processing units PU1 and the plurality of second processing units PU2.

Figure 2:
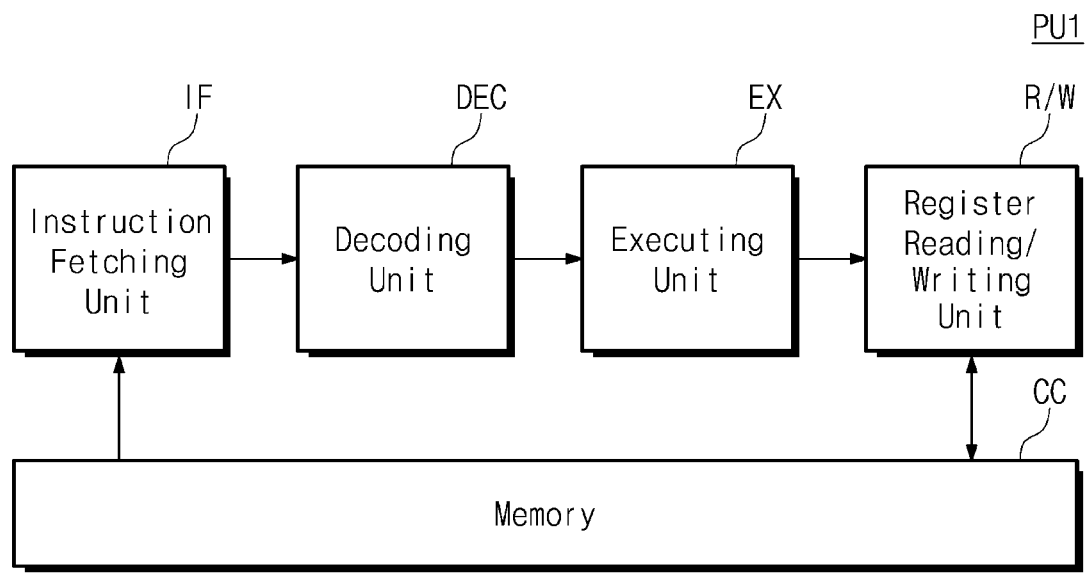
FIG. 2 is a block diagram illustrating an example of one of a plurality of first processing units of FIG. 1.

FIG. 2 is a block diagram illustrating an example of one of a plurality of first processing units of FIG. 1. For convenience of description, the first processing unit PU1 will be described based on a schematic structure of a general CPU, but the present disclosure is not limited thereto. For convenience of description, one first processing unit PU1 will be described, but the present disclosure is not limited thereto. Structures of the remaining first processing units PU1 may also be similar to a structure to be described with reference to FIG. 2.

Referring to FIGS. 1 and 2, the first processing unit PU1 may include a memory CC, an instruction fetching unit IF, a decoding unit DEC, an executing unit EX, and a register reading/writing unit R/W.

The memory CC may store an instruction to be processed by the first processing unit PU1, data to be used by the first processing unit PU1, and data generated by the first processing unit PU1. In an embodiment, the memory CC may include an instruction cache configured to store an instruction, a data cache configured to store data, a register configured to store a register file, or a memory configured to store a variety of information that is used or generated by the first processing unit PU1.

The instruction fetching unit IF may fetch an instruction stored in the memory CC. For example, the instruction fetching unit IF may read an instruction stored in the memory CC (e.g., the instruction cache) based on a program counterer PC (refer to FIG. 8). The instruction fetching unit IF may transfer the read instruction to the decoding unit DEC.

The decoding unit DEC may decode the instruction received from the instruction fetching unit IF. For example, the decoding unit DEC may determine a kind of the received instruction (e.g., whether the received command is a load instruction, a store instruction, or an operation instruction). The decoding unit DEC may transfer the decoded instruction to the executing unit EX.

The executing unit EX may perform various operations based on the instruction (i.e., the decoded instruction) received from the decoding unit DEC. For example, the executing unit EX may include an arithmetic logic unit (ALU) configured to perform an arithmetic operation or a logic operation, a floating point calculating unit (FP) configured to perform a floating point operation, and a special function unit (SF) configured to perform a specific function. The executing unit EX may be configured to execute an algebraic operation, a floating point operation, or a specific function depending on the received instruction.

The register reading/writing unit R/W may be configured to store an operation result or an execution result of the executing unit EX in the memory CC. In an embodiment, the register reading/writing unit R/W may be configured to store the operation result (i.e., result data) of the executing unit EX in the data cache of the memory CC. Alternatively, the register reading/writing unit R/W may be configured to store the execution result of the executing unit EX as a register file in the register of the memory CC.

As described above, the first processing unit PU1 may execute various calculations or operations based on the instruction stored in the memory CC. In an embodiment, the instruction that is executable by the first processing unit PU1 may have a given instruction set architecture (ISA). The given instruction set architecture (ISA) may include at least one of various types such as x86 ISA, x64 ISA, x86-64 ISA, RISC (Reduced Instruction Set Computing) ISA, CISC (Complex Instruction Set Computing) ISA, Arm v8 ISA, and RISC-V ISA. In an embodiment, the structure (or configuration) of the first processing unit PU1 may be determined depending on a type of the instruction set architecture.

Figure 3:
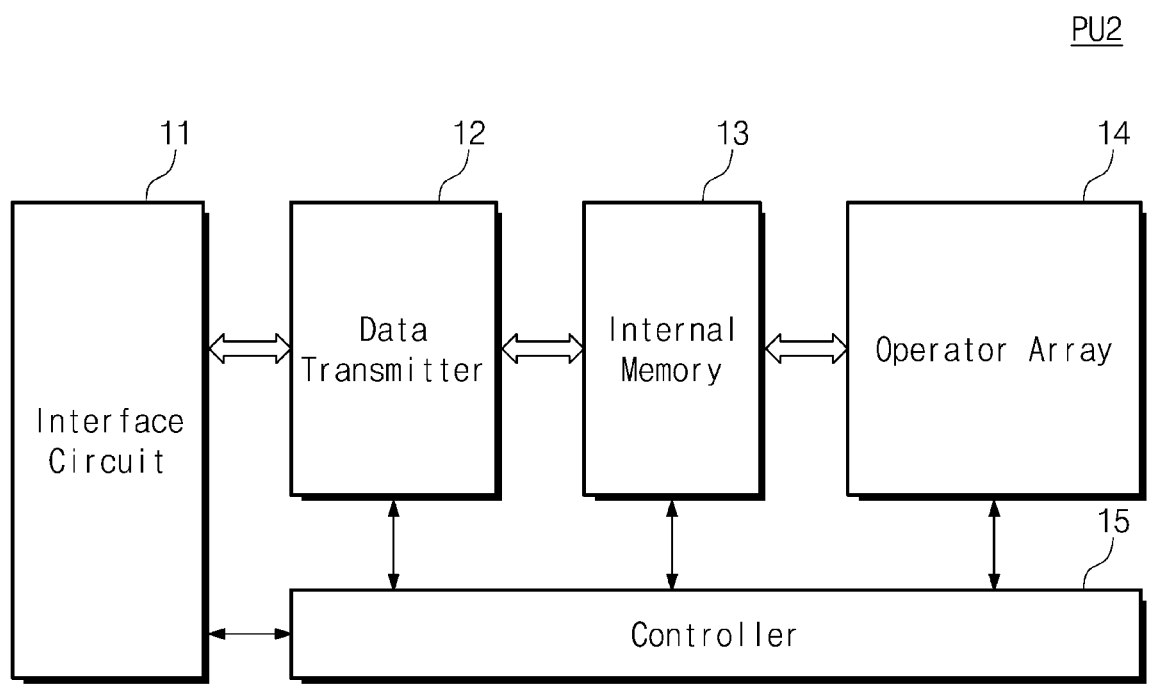
FIG. 3 is a block diagram illustrating an example of one of a plurality of second processing units of FIG. 1.

FIG. 3 is a block diagram illustrating an example of one of a plurality of second processing units of FIG. 1. In an embodiment, the second processing unit PU2 of FIG. 3 may be a hardware accelerator configured to perform an artificial intelligence computation. However, the present disclosure is not limited thereto. For example, the second processing unit PU2 may be one of various hardware operators configured to support a graphics processing unit or a parallel operation.

Referring to FIGS. 1 and 3, the second processing unit PU2 may include an interface circuit 11, a data transmitter 12, an internal memory 13, an operator array 14, and a controller 15.

The interface circuit 11 may support the communication with external devices (e.g., the plurality of memories MEM and the plurality of first processing units PU1) over the network NT. In an embodiment, the interface circuit 11 may be implemented with at least one of various interfaces such as an ATA (Advanced Technology Attachment) interface, a SATA (Serial ATA) interface, an e-SATA (external SATA) interface, a SCSI (Small Computer Small Interface), a SAS (Serial Attached SCSI), a PCI (Peripheral Component Interconnection) interface, a PCIe (PCI express) interface, an NVMe (NVM express) interface, an IEEE 1394 interface, a USB (Universal Serial Bus) interface, SD (Secure Digital) card interface, an MMC (Multi-Media Card) interface, an eMMC (embedded MMC) interface, an UFS (Universal Flash Storage) interface, an eUFS (embedded UFS) interface, a CF (Compact Flash) card interface, a DDR (Double Data Rate) interface, an UART (Universal Asynchronous Receiver-Transmitter) interface, an SPI (Serial Peripheral Interface), an I2C (Inter-Integrated Circuit) interface, an I3C interface, and a Bluetooth interface.

The data transmitter 12 may be configured to perform or manage data movement between the external devices and the internal memory 13. The data transmitter 12 may be a direct memory access (DMA) engine configured to perform a DMA operation between the external devices and the internal memory 13.

The internal memory 13 may store input data received from the external devices, and intermediate data or result data generated by the operator array 14. In an embodiment, the internal memory 13 may be a high-speed memory such as an SRAM or a DRAM.

The operator array 14 may include a plurality of floating point operators (or fixed point operators) configured to support a parallel operation. The operator array 14 may perform a high-speed operation or a parallel operation on the input data stored in the internal memory 13. In an embodiment, the input data may be a large amount of matrix data, and the operator array 14 may be configured to support a high-speed operation or a parallel operation on a large amount of matrix data.

The controller 15 may be configured to receive an instruction from an external device (e.g., at least one of the plurality of first processing units PU1) through the interface circuit 11 and to control components of the second processing unit PU2 based on the received instruction.

As described above, the second processing unit PU2 may be configured to perform an operation (e.g., a convolution operation for an artificial intelligence operation) on a large amount of matrix data under control of the external device.

In an embodiment, the configuration and operation of the second processing unit PU2 described with reference to FIG. 3 show one layer operation associated with one input data. However, the artificial intelligence operation may include a plurality of layers, and the iteration of the structure or operation described with reference to FIG. 3 may be required for the whole artificial intelligence operation.

As described with reference to FIGS. 2 and 3, each of the first processing unit PU1 and the second processing unit PU2 included in the computing system 10 is a base unit of the computing system 10 and is configured to operate based on the given instruction set architecture or to support only a specific operation. In an embodiment, the base unit of the computing system 10 may indicate a basic unit of components constituting a computing system. For example, the base unit of the computing system may indicate one operator such as a single processor or a single core. That is, there may decrease the versatility with regard to the base unit of the computing system 10. Alternatively, because various operations are performed based on different base units, the whole efficiency of the computing system 10 may decrease.

Figure 4:
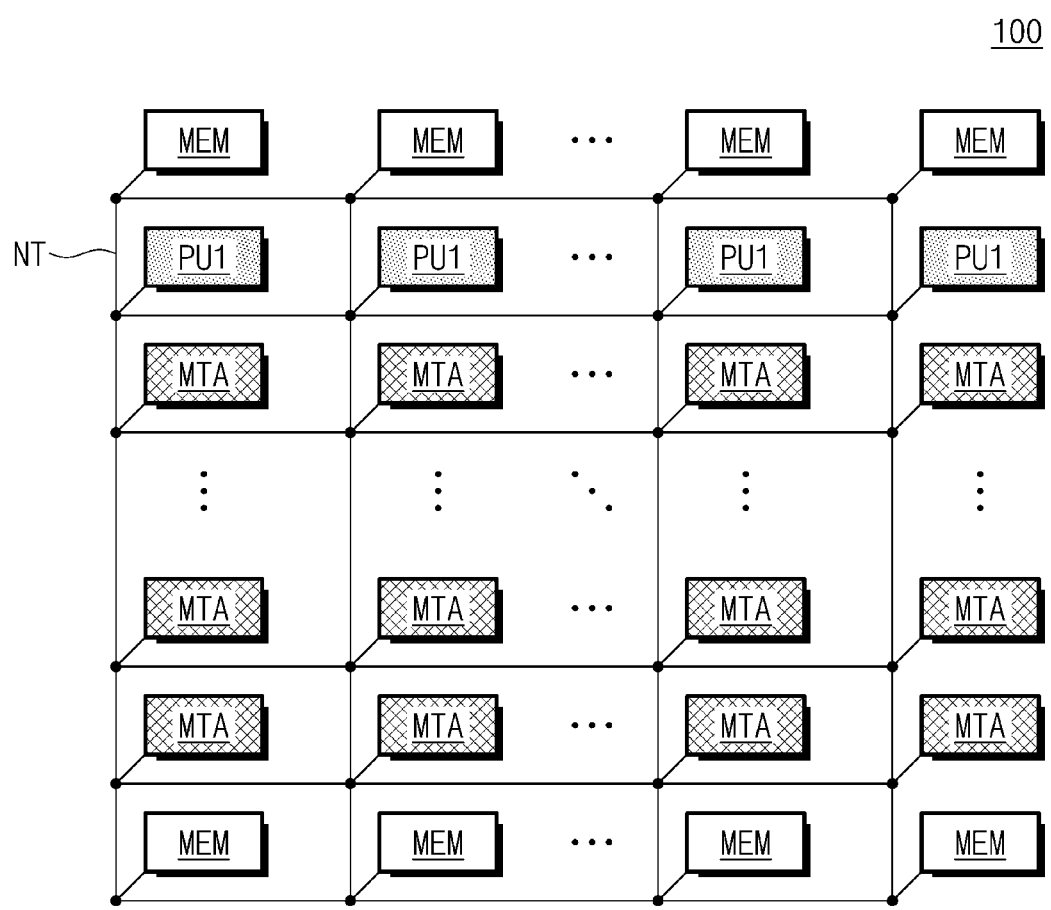
FIG. 4 is a block diagram illustrating an example of a computing system, according to an embodiment of the present disclosure.

FIG. 4 is a block diagram illustrating an example of a computing system, according to an embodiment of the present disclosure. For convenience of description, additional description associated with the components described above will be omitted to avoid redundancy. Referring to FIG. 4, a computing system 100 may include a plurality of memories MEM, a plurality of first processing units PU1, a plurality of multi-thread accelerators MTA, and a network NT. The plurality of memories MEM and the plurality of first processing units PU1 are similar to those described above, and thus, additional description will be omitted to avoid redundancy.

The plurality of memories MEM, the plurality of first processing units PU1, and the plurality of multi-thread accelerators MTA may be interconnected over the network NT. The plurality of first processing units PU1 and the plurality of multi-thread accelerators MTA may be a base unit of the computing system 100.

In an embodiment, the plurality of first processing units PU1 may be configured to control overall operations of the computing system 100. For example, the plurality of first processing units PU1 may be configured to perform computation associated with an operation or a control of the computing system 100. The plurality of first processing units PU1 are similar to those described with reference to FIGS. 1 and 2, and thus, additional description will be omitted to avoid redundancy.

Unlike the embodiment of FIG. 1, in the embodiment of FIG. 4, various computation operations may be processed or executed through the multi-thread accelerators MTA. For example, in the embodiment of FIG. 1, the first processing unit PU1 and the second processing unit PU2 are configured to perform different types of computations (or operations). In contrast, in the embodiment of FIG. 4, the multi-thread accelerators MTA may process various types of computations (or operations) at the same time or in parallel. Accordingly, the versatility of the computing system 100 may be improved.

Figure 5:
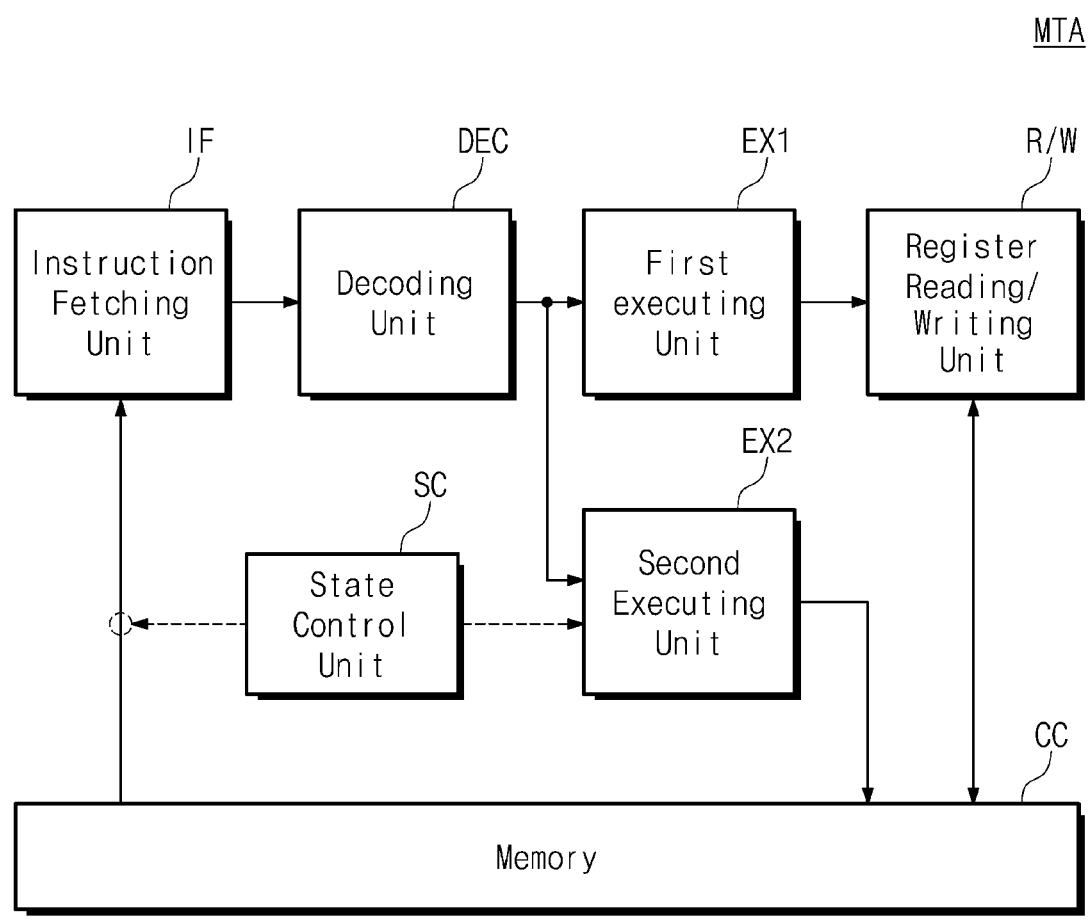
FIG. 5 is a block diagram illustrating an example of a multi-thread accelerator of FIG. 4.

FIG. 5 is a block diagram illustrating an example of a multi-thread accelerator of FIG. 4. For convenience of description, additional description associated with the components described above will be omitted to avoid redundancy. Referring to FIGS. 4 and 5, the multi-thread accelerator MTA may include a memory CC, an instruction fetching unit IF, a decoding unit DEC, a first executing unit EX1, a register reading/writing unit R/W, a state control unit SC, and a second executing unit EX2. The instruction fetching unit IF, the decoding unit DEC, the first executing unit EX1, and the register reading/writing unit R/W are similar to those of the first processing unit PU1 of FIG. 2, and thus, additional description will be omitted to avoid redundancy. Below, for convenience of description, the expression "multi-thread accelerator MTA" is used, but the multi-thread accelerator MTA may indicate a general-purpose computing accelerator or a general-purpose accelerator that is used in the computing system 100.

The second executing unit EX2 may be configured to perform a high-speed operation or a parallel operation on a large amount of matrix data. For example, the second executing unit EX2 may include a plurality of floating point operators configured to perform a high-speed operation or a parallel operation on a large amount of matrix data. In an embodiment, the second executing unit EX2 may be an operator that is physically separated from the ALU of the first executing unit EX1. The plurality of floating point operators included in the second executing unit EX2 may support various precisions.

The state control unit SC may control a data flow in the multi-thread accelerator MTA, based on a ready state of the second executing unit EX2 or a ready state of data to be processed by the second executing unit EX2. For example, the multi-thread accelerator MTA may be configured to perform various computation operations depending on an instruction type. The state control unit SC may control respective components such that an instruction and data for a first instruction are processed by the first executing unit EX1 and an instruction and data for a second instruction are processed by the second executing unit EX2. A configuration and an operation of the state control unit SC will be described in more detail with reference to the following drawings.

In an embodiment, the memory CC may include an instruction cache configured to store an instruction, a data cache configured to store data, and a register configured to store a register file. In an embodiment, the memory CC may further include a large-amount matrix data cache configured to store a large amount of matrix data to be processed by the second executing unit EX2. In an embodiment, the memory CC may operate in a cache mode or may operate in a scratchpad memory (SPM) mode.

As described above, the multi-thread accelerator MTA that is the base unit of the computing system 100 according to an embodiment of the present disclosure may process various types of instructions at the same time or in parallel. In an embodiment, the base unit of the computing system 10 may indicate a basic unit of components constituting a computing system. For example, the base unit of the computing system may indicate one operator such as a single processor or a single core. That is, the multi-thread accelerator MTA according to an embodiment of the present disclosure may be implemented with a single processor or a single core and may process various types of instructions (e.g., a general-purpose instruction and a high-capacity matrix operation instruction for artificial intelligence computation) at the same time or in parallel. Accordingly, the computing system 100 may be simple in structure and may provide improved versatility. In an embodiment, the computing system 100 according to an embodiment of the present disclosure may support a pipeline structure. The pipeline structure of the computing system 100 will be described in more detail with reference to the following drawings.

Figure 6:
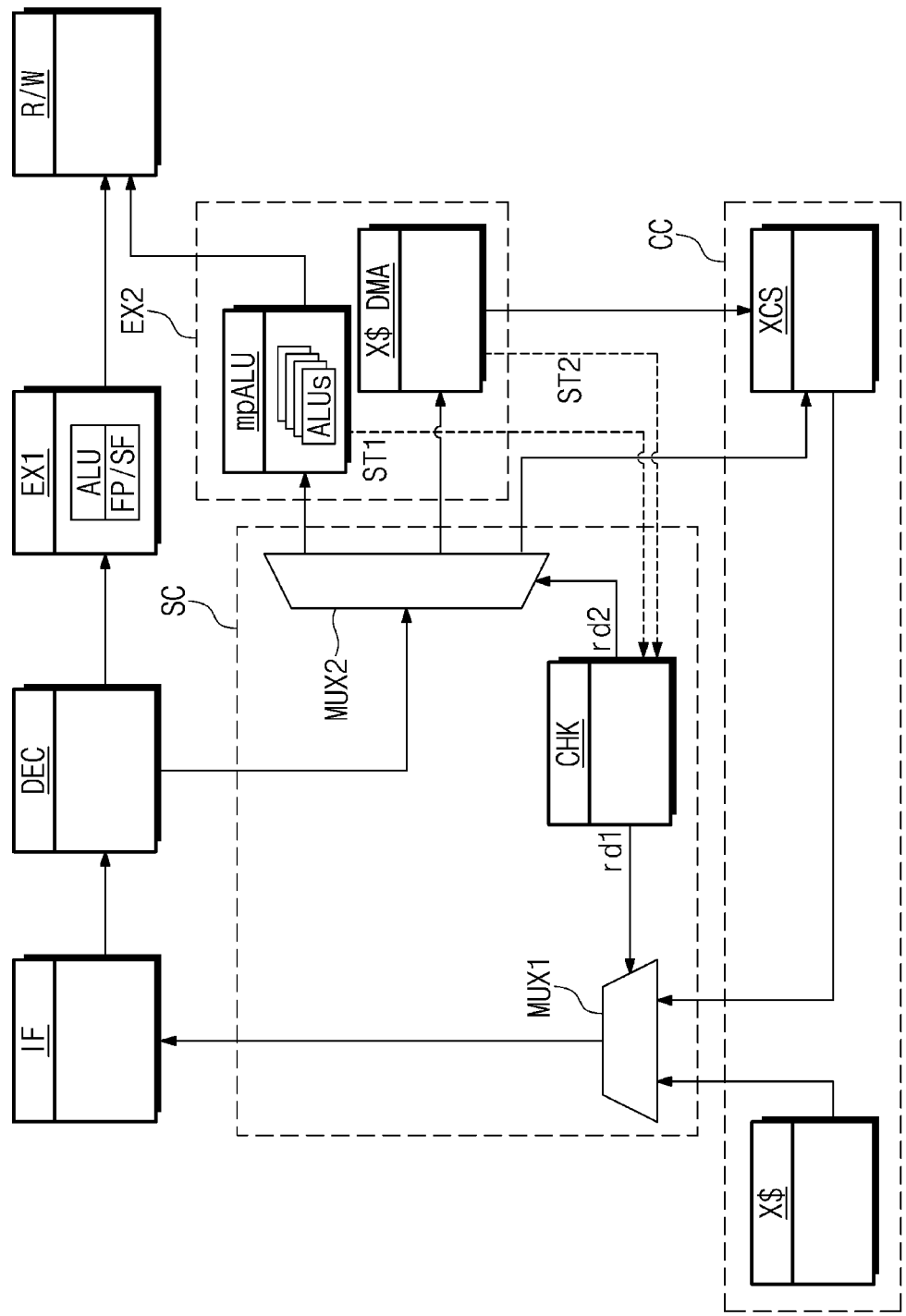
FIG. 6 is a diagram illustrating a multi-thread accelerator of FIG. 5 in detail.

FIG. 6 is a diagram illustrating a multi-thread accelerator of FIG. 5 in detail. For convenience of description, additional description associated with the components described above will be omitted to avoid redundancy. Below, for convenience of description, it is assumed that the multi-thread accelerator MTA processes an RICS-V instruction (hereinafter referred to as an "R-V instruction") and an extended instruction (hereinafter referred to as an "X instruction") for computation of a large amount of matrix data. That is, the multi-thread accelerator MTA may be configured to perform a general-purpose computation based on the R-V instruction or to perform a computation of a large amount of matrix data based on the X instruction.

Referring to FIGS. 5 and 6, the multi-thread accelerator MTA may include the memory CC, the instruction fetching unit IF, the decoding unit DEC, the first executing unit EX1, the register reading/writing unit R/W, the state control unit SC, and the second executing unit EX2. The second executing unit EX2 may include a multi-precision arithmetic logic unit mpALU and an extended cache direct memory access unit X$ DMA. The memory CC may include an extended cache X$ and an extended context switch XCS. In an embodiment, the extended cache X$ may include a data cache, an instruction cache, and a large-amount matrix data cache.

The state control unit SC may include a determiner CHK, a first selector MUX1, and a second selector MUX2. The determiner CHK may generate a first ready signal rd1 and a second ready signal rd2, based on an operation state of the second executing unit EX2. The determiner CHK may check a first operation state ST1 of the multi-precision arithmetic logic unit mpALU and a second operation state ST2 of the extended cache direct memory access unit X$ DMA. The determiner CHK may generate the first and second ready signals rd1 and rd2 based on the first operation state ST1 and the second operation state ST2.

The first selector MUX1 may transfer, to the instruction fetching unit IF, information from one of the extended cache X$ and the extended context switch XCS in response to the first ready signal rd1. The second selector MUX2 may transfer information from the decoding unit DEC to one of the multi-precision arithmetic logic unit mpALU, the extended cache direct memory access unit X$ DMA, and the extended context switch XCS based on the second ready signal rd2.

For example, at a current thread, when a large amount of matrix data are not ready or when the multi-precision arithmetic logic unit mpALU is operating, that is, when there is no need to perform computation on the current thread, the extended context switch XCS of the memory CC may be configured to store a register file corresponding to the current thread.

At a next thread, when the extended context switch XCS includes the register file and operations of the multi-precision arithmetic logic unit mpALU and the extended cache direct memory access unit X$ DMA of the second executing unit EX2 are in a state of being completed, the determiner CHK may generate the first ready signal rd1 such that the register file of the extended context switch XCS is provided to the instruction fetching unit IF. Alternatively, when the extended context switch XCS does not include the register file and operations of the multi-precision arithmetic logic unit mpALU and the extended cache direct memory access unit X$ DMA of the second executing unit EX2 are in a state of being not completed, the determiner CHK may generate the first ready signal rd1 such that the instruction of the extended cache X$ is provided to the instruction fetching unit IF.

The instruction fetching unit IF may transfer the fetched information to the decoding unit DEC. The decoding unit DEC may decode the transferred information.

In an embodiment, when the decoding result indicates the R-V instruction, the decoding unit DEC may transfer the decoded instruction to the first executing unit EX1, and the first executing unit EX1 may perform an operation corresponding to the decoded instruction.

In an embodiment, when the decoding result is determined as a register file, an instruction corresponding to the register file may be the X instruction. The reason, as described above, may be that the operation of the second executing unit EX2 is not completed at a previous thread and thus a register file is stored in the extended context switch XCS. Accordingly, the instruction of the register file fetched from the extended context switch XCS is the X instruction. Accordingly, when the decoding result is determined as a register file, the X instruction may be provided to the multi-precision arithmetic logic unit mpALU of the second executing unit EX2, and the multi-precision arithmetic logic unit mpALU may perform an operation corresponding to the received X instruction.

In an embodiment, in the case of an indication that the decoding result is not a register file but the X instruction, the decoded instruction (i.e., the X instruction) may be provided to one of the multi-precision arithmetic logic unit mpALU, the extended cache direct memory access unit X$ DMA, and the extended context switch XCS, depending on the second ready signal rd2 of the determiner CHK.

For example, when a large amount of matrix data corresponding to the decoded instruction (i.e., the X instruction) is not ready, the X instruction is provided to the extended cache direct memory access unit X$ DMA. In response to the received X instruction, the extended cache direct memory access unit X$ DMA may perform an input DMA operation of moving a large amount of matrix data from an external memory (e.g., MEM of FIG. 4) to the extended cache X$. In an embodiment, the extended cache direct memory access unit X$ DMA may perform an output DMA operation of moving data from the extended cache X$ to an external memory (e.g., MEM of FIG. 4). The extended cache direct memory access unit X$ DMA may write the X instruction as a register file in the extended context switch XCS. The extended cache direct memory access unit X$ DMA may provide the determiner CHK with information about a state of the DMA operation (i.e., information about whether the DMA operation is completed) as the second operation state ST2. As described above, when a large amount of matrix data corresponding to the X instruction are not ready in the extended cache X$, the determiner CHK may generate the second ready signal rd2 such that the instruction decoded by the decoding unit DEC is provided to the extended cache direct memory access unit X$ DMA.

Alternatively, when a large amount of matrix data corresponding to the decoded instruction (i.e., the X instruction) are ready in the extended cache X$ but the multi-precision arithmetic logic unit mpALU is currently operating (i.e., when the multi-precision arithmetic logic unit mpALU is incapable of processing the X instruction), the determiner CHK may generate the second ready signal rd2 such that the instruction decoded by the decoding unit DEC is provided to the extended context switch XCS. The decoded instruction (i.e., the X instruction) may be stored in the extended context switch XCS as a register file. In an embodiment, the X instruction stored as the register file may be processed at a next thread or at any other thread after the current thread. In an embodiment, the multi-precision arithmetic logic unit mpALU may provide information about an operation state as the first operation state ST1 to the determiner CHK.

Alternatively, when a large amount of matrix data corresponding to the decoded instruction (i.e., the X instruction) are ready and the multi-precision arithmetic logic unit mpALU is capable of operating (i.e., when the multi-precision arithmetic logic unit mpALU does not operate currently), the determiner CHK may generate the second ready signal rd2 such that the X instruction is provided to the multi-precision arithmetic logic unit mpALU. The multi-precision arithmetic logic unit mpALU may perform an operation corresponding to the X instruction. An operation result of the multi-precision arithmetic logic unit mpALU may be written in the memory CC by the register reading/writing unit R/W.

In an embodiment, the second selector MUX2 may perform an instruction transfer in response to the second ready signal rd2 as described above.

As described above, the multi-thread accelerator MTA being the base unit of the computing system 100 according to the present disclosure may be provided. The multi-thread accelerator MTA may support an extended instruction for computation of a large amount of matrix data, as well as a general-purpose instruction, and may support a pipeline structure between respective instructions. Accordingly, the versatility of the computing system 100 may be extended, and the structure of the computing system 100 may be simplified.

Figure 7:
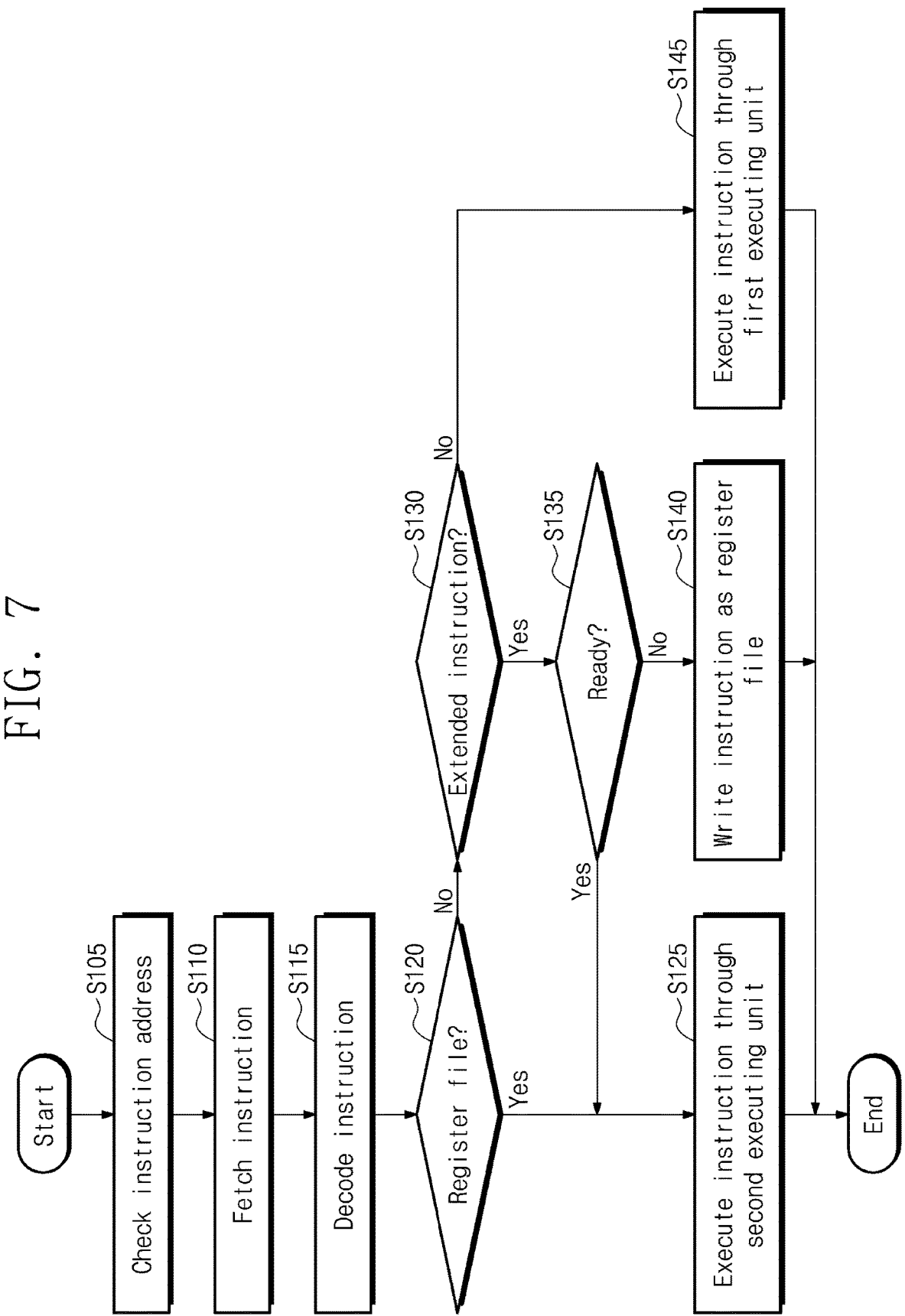
FIG. 7 is a flowchart illustrating an example of an operation of a multi-thread accelerator of FIG. 6.

FIG. 7 is a flowchart illustrating an example of an operation of a multi-thread accelerator of FIG. 6. For convenience of description, additional description associated with the components described above will be omitted to avoid redundancy. In an embodiment, an example in which one thread is executed will be described with reference to FIG. 7, but the present disclosure is not limited thereto. For example, the multi-thread accelerator MTA may repeatedly perform operations according to the flowchart of FIG. 7 or may parallel-perform respective operations according to the flowchart of FIG. 7.

Referring to FIGS. 5 to 7, in operation S105, the multi-thread accelerator MTA may check an instruction address. In operation S110, the multi-thread accelerator MTA may fetch an instruction based on the checked instruction address. For example, the instruction fetching unit IF may fetch an instruction from the extended cache X$ based on the program counter PC (refer to FIG. 8). In this case, the state control unit SC may provide the instruction fetching unit IF with a register file of the extended context switch XCS, based on whether the register file of the extended context switch XCS exits and an operation state of the second executing unit EX2. That is, the instruction fetching unit IF may fetch an instruction or a register file under control of the state control unit SC. In an embodiment, when the register file of the extended context switch XCS exists, the register file of the extended context switch XCS may take priority over an instruction stored in the extended cache X$.

In operation S115, the multi-thread accelerator MTA may decode the instruction. For example, the decoding unit DEC of the multi-thread accelerator MTA may receive the instruction or the register file from the instruction fetching unit IF. The decoding unit DEC may decode the received instruction or register file.

In operation S120, the multi-thread accelerator MTA may determine whether a decoding result is a register file. When the decoding result is the register file, in operation S125, the multi-thread accelerator MTA may execute the instruction through the second executing unit EX2. For example, as described above, that the decoding result is the register file means that a large amount of matrix data associated with the X instruction not executed at a previous thread are ready. In other words, that the multi-thread accelerator MTA fetches the register file means to perform an operation corresponding to the X instruction, that is, to perform computation for a large amount of matrix data. Accordingly, when the decoding result is the register file, the multi-thread accelerator MTA may perform computation for a large amount of matrix data through the multi-precision arithmetic logic unit mpALU of the second executing unit EX2. In an embodiment, a large amount of matrix data may be stored in a large-amount matrix data cache of the extended cache X$. The multi-precision arithmetic logic unit mpALU may perform computation by accessing the large-amount matrix data cache of the extended cache X$.

When the decoding result in operation S120 is determined as being not the register file, in operation S130, the multi-thread accelerator MTA may determine whether the decoding result is an extended instruction (i.e., the X instruction).

When the decoding result is determined as the extended instruction (i.e., the X instruction), in operation S135, the multi-thread accelerator MTA may determine whether components for processing the X instruction are ready. For example, the state control unit SC (or the determiner CHK) of the determiner CHK may check the first operation state ST1 of the multi-precision arithmetic logic unit mpALU of the second executing unit EX2 and the second operation state ST2 of the extended cache direct memory access unit X$ DMA. When a result of checking an operation state indicates that the multi-precision arithmetic logic unit mpALU is capable of operating and an operation of the extended cache direct memory access unit X$ DMA is completed (i.e., that a large amount of matrix data are ready) (i.e., Yes in operation S135), the multi-thread accelerator MTA may perform operation S125. That is, the multi-thread accelerator MTA may execute the instruction through the second executing unit EX2.

When the multi-precision arithmetic logic unit mpALU is currently operating or the operation of the extended cache direct memory access unit X$ DMA is not completed (i.e., that a large amount of matrix data are not ready) (i.e., No in operation S135), in operation S140, the multi-thread accelerator MTA may write the X instruction as a register file in the extended context switch XCS. In an embodiment, when a large amount of matrix data are ready by the extended cache direct memory access unit X$ DMA and an operation of the multi-precision arithmetic logic unit mpALU is possible, the X instruction written in the register file may be executed at a next thread.

In an embodiment, when a large amount of matrix data are ready (i.e., a large amount of matrix data are ready in the extended cache X$) but the multi-precision arithmetic logic unit mpALU is not available, the X instruction may be written in the extended context switch XCS as the register file. When a large amount of matrix data are not ready (i.e., a large amount of matrix data are not ready in the extended cache X$), the X instruction may be provided to the extended cache direct memory access unit X$ DMA, and the extended cache direct memory access unit X$ DMA may perform a direct memory access (DMA) operation such that a large amount of matrix data are copied or moved from an external memory (e.g., MEM of FIG. 4) to the extended cache X$. After the direct memory access (DMA) operation of the extended cache direct memory access unit X$ DMA is completed, the X instruction may be written in the extended context switch XCS as a register file. That is, that the X instruction is written in the extended context switch XCS as a register file may indicate that a large amount of matrix data are ready in the extended cache X$.

When a determination result in operation S130 indicates that the decoding result is not the extended instruction (i.e., the R-V instruction), in operation S145, the multi-thread accelerator MTA may execute the R-V instruction through the first executing unit EX1.

In an embodiment, in FIG. 7, the operation of the multi-thread accelerator MTA is described based on the process of processing one thread, but the present disclosure is not limited thereto. For example, the multi-thread accelerator MTA may process a plurality of threads by repeatedly performing the operations of the flowchart illustrated in FIG. 7 or by parallel-performing the respective operations of the flowchart illustrated in FIG. 7.

Figure 8:
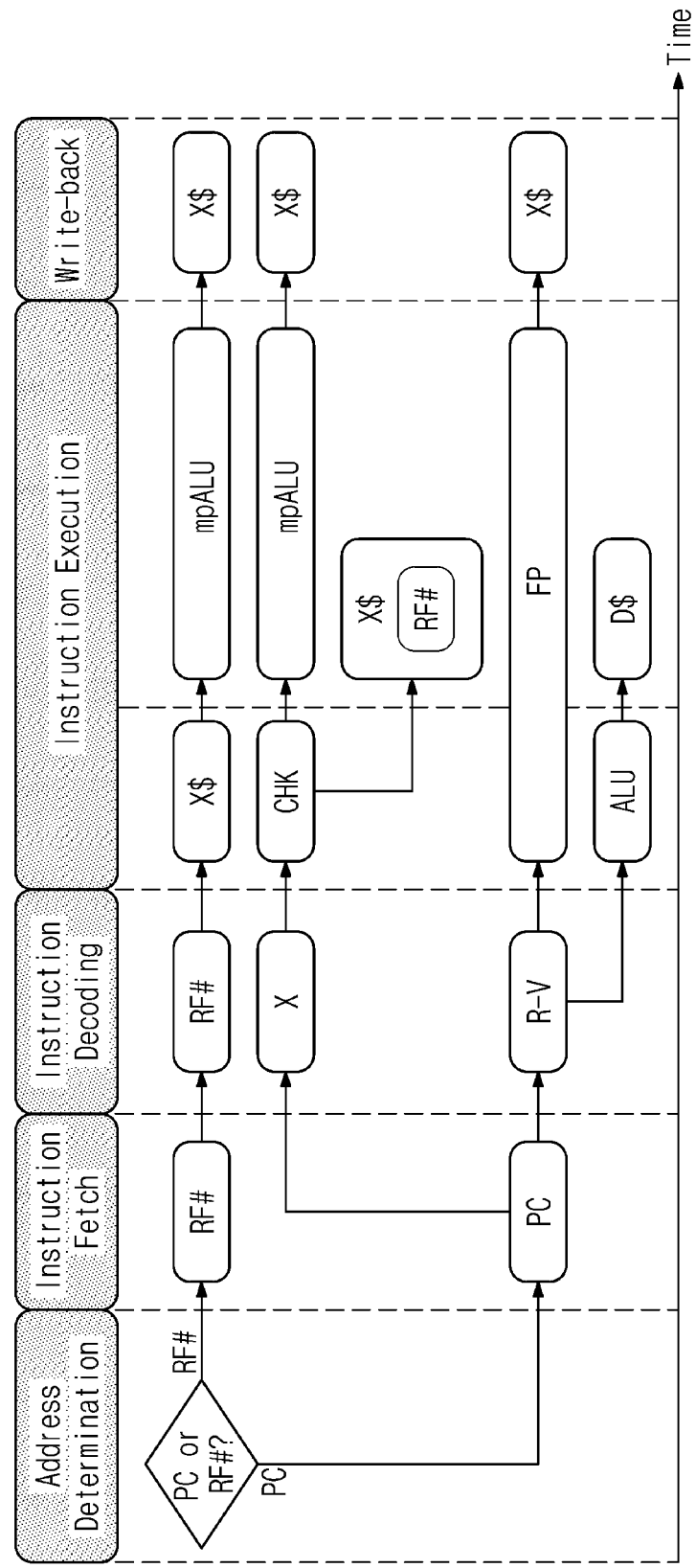
FIG. 8 is a diagram for describing an operation of a pipeline operation of a multi-thread accelerator of FIG. 6.

FIG. 8 is a diagram for describing an operation of a pipeline operation of a multi-thread accelerator of FIG. 6.

For convenience of description, additional description associated with the components described above will be omitted to avoid redundancy. A process in which the multi-thread accelerator MTA processes one thread will be described with reference to FIG. 8, but the present disclosure is not limited thereto. For example, operations of FIG. 8 may be parallel-performed in a pipeline manner.

Referring to FIGS. 6 and 8, the multi-thread accelerator MTA may perform address determination. For example, the multi-thread accelerator MTA may determine whether the X instruction not processed at a previous thread exists. In this case, the X instruction not processed at the previous thread may be in a state of being stored in the register file RF # of the extended context switch XCS. Alternatively, the multi-thread accelerator MTA may determine an address of a new instruction based on the program counter PC.

In an embodiment, when both the register file RF # and the program counter PC are available, the register file RF # may have a priority. That is, the multi-thread accelerator MTA may preferentially process the X instruction written in the register file RF #.

When the X instruction not processed previously is present in the register file RF #, at an instruction fetch step, the multi-thread accelerator MTA may read the register file RF # and may decode the register file RF #. In this case, an instruction corresponding to the register file RF # may be the X instruction, and a large amount of matrix data may be in a state of being ready in the extended cache X$. The reason of the above case is described above, and thus, additional description will be omitted to avoid redundancy.

Afterwards, at an instruction execution step, the multi-thread accelerator MTA may perform computation through the multi-precision arithmetic logic unit mpALU. For example, the multi-thread accelerator MTA may access the extended cache X$ to read a large amount of matrix data and may perform computation on the large amount of matrix data through the multi-precision arithmetic logic unit mpALU. At a write-back step, a computation result of the multi-precision arithmetic logic unit mpALU may be stored in the extended cache X$.

As described above, when the multi-thread accelerator MTA accesses the register file RF # at the address determination step and the instruction fetch step, the corresponding instruction may be the X instruction, and thus, the multi-thread accelerator MTA may perform computation on a large amount of matrix data through the second executing unit EX2.

At the address determination step and the instruction fetch step, when information corresponding to the program counter PC is read, the corresponding instruction may be one of the X instruction and the R-V instruction. When there is made the decoding to the R-V instruction at the instruction decoding step, at the instruction execution step, the multi-thread accelerator MTA may perform computation through a floating point operator FP of the first executing unit EX1 and may store a computation result in the extended cache X$. Alternatively, when there is made the decoding to the R-V instruction at the instruction decoding step, at the instruction execution step, the multi-thread accelerator MTA may perform computation through an arithmetic logic unit ALU and may store a computation result in a data cache D$. In an embodiment, the data cache D$ may be a partial region of the memory CC.

When there is made the decoding to the X instruction at the instruction decoding step, at the instruction execution step, the multi-thread accelerator MTA may determine an operation state of the second executing unit EX2. For example, the determiner CHK of the state control unit SC may determine operation states of the multi-precision arithmetic logic unit mpALU of the second executing unit EX2 and the extended cache direct memory access unit X$ DMA. When a result of determining the operation states indicates that a large amount of matrix data are ready and an operation of the multi-precision arithmetic logic unit mpALU is possible, the multi-thread accelerator MTA may perform an operation corresponding to the X instruction through the multi-precision arithmetic logic unit mpALU and may store a result of the operation in the extended cache X$. When the result of determining the operation states indicates that a large amount of matrix data are not ready and the operation of the multi-precision arithmetic logic unit mpALU is impossible (i.e., the multi-precision arithmetic logic unit mpALU is currently performing any other operation), the multi-thread accelerator MTA may write the X instruction as the register file RF # in the extended cache X$ (or the extended context switch XCS).

In an embodiment, after the X instruction is written in the extended cache X$ (or the extended context switch XCS) as the register file RF #, the multi-thread accelerator MTA may process any other thread. In an embodiment, the X instruction written in the extended cache X$ (or the extended context switch XCS) as the register file RF # may be processed at a next thread or at any other thread after the current thread.

As described above, according to the present disclosure, the multi-thread accelerator MTA may process a general instruction (e.g., the R-V instruction) and an instruction (e.g., an extended instruction, that is, the X instruction) specialized for artificial intelligence computation. Accordingly, compared to a conventional processing unit, the multi-thread accelerator MTA has improved versatility and improved utilization. Also, as the multi-thread accelerator MTA is used as a base unit of the computing system 100 (or a super computer), the performance of the computing system 100 may be improved, and costs may be reduced.

Figure 9:
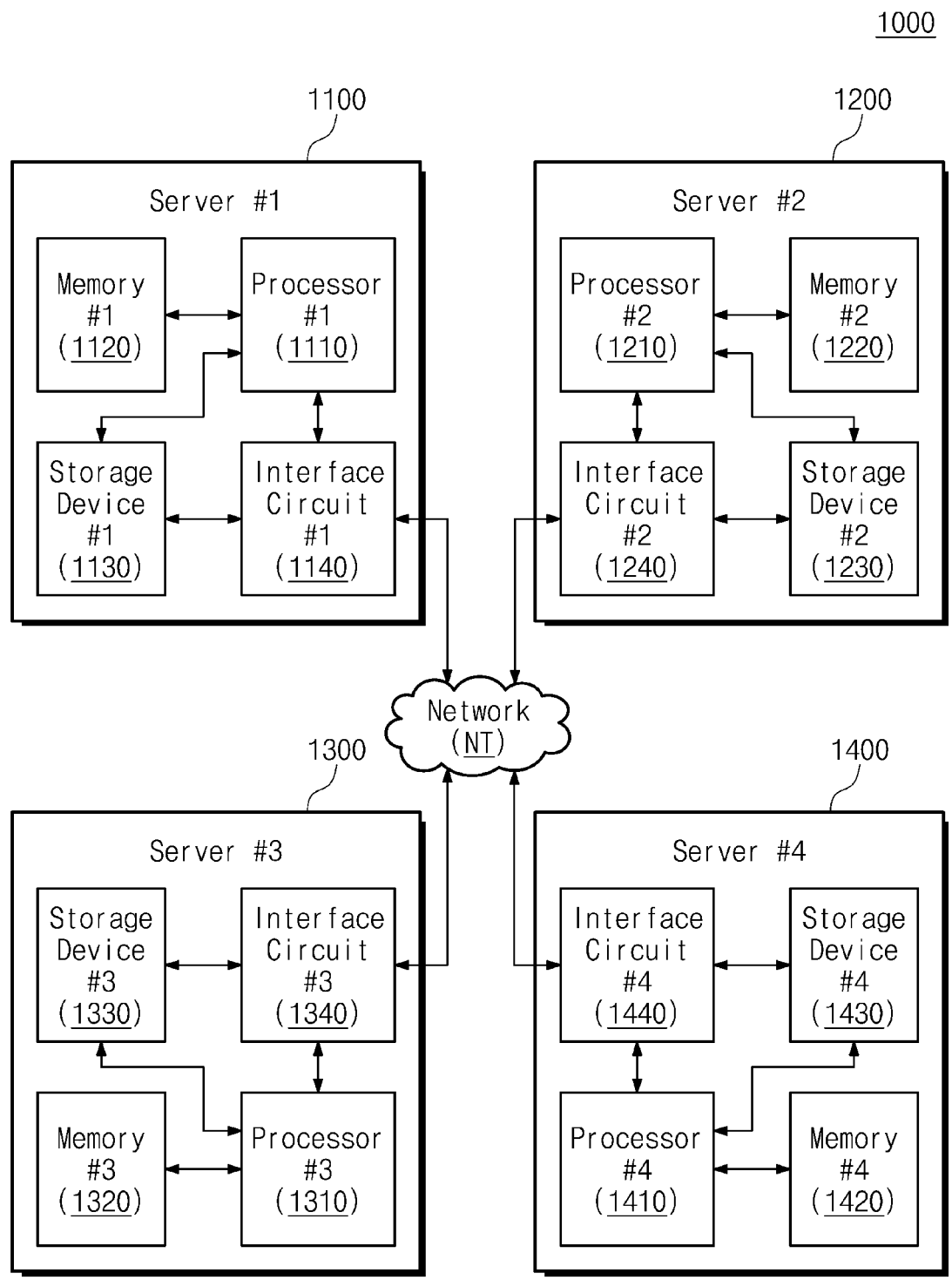
FIG. 9 is a block diagram illustrating a computing center to which a computing system according to an embodiment of the present disclosure is applied.

FIG. 9 is a block diagram illustrating a computing center to which a computing system according to an embodiment of the present disclosure is applied. Referring to FIG. 9, a computing center 1000 may include a plurality of computing nodes (or servers) 1100 to 1400. The plurality of computing nodes 1100 to 1400 may communicate with each other over the network NT. In an embodiment, the network NT may be a storage-dedicated network such as a storage area network (SAN) or may be an Internet network such as TCP/IP. In an embodiment, the network NT may include at least one of various communication protocols such as Fibre channel, iSCSI protocol, FCoE, NAS, and NVMe-oF.

The plurality of computing nodes 1100 to 1400 may include processors 1110, 1210, 1310, and 1410, memories 1120, 1220, 3120, and 1420, storage devices 1130, 1230, 3130, and 1430, and interface circuits 1140, 1240, 1340, and 1440.

For example, the first computing node 1100 may include the first processor 1110, the first memory 1120, the first storage device 1130, and the first interface circuit 1140. In an embodiment, the first processor 1110 may be implemented with a single core or a multi-core. The first memory 1120 may include a memory such as a DRAM, an SDRAM, an SRAM, a 3D XPoint memory, an MRAM, a PRAM, a FeRAM, or a ReRAM. The first memory 1120 may be used as a system memory, a working memory, or a buffer memory of the first computing node 1100. The first storage device 1130 may be a high-capacity storage medium such as a hard disk drive (HDD) or a solid state drive (SSD). The first interface circuit 1140 may be a network interface controller (NIC) configured to support communication over the network NT.

In an embodiment, the first processor 1110 of the first computing node 1100 may be configured to access the first memory 1120 based on a given memory interface. Alternatively, in an embodiment of a shared memory architecture, the first processor 1110 of the first computing node 1100 may be configured to access the memories 1220, 1320, and 1420 of the remaining computing nodes 1200, 1300, and 1400 over the network NT. The interface circuit 1140 may include a network switch (not illustrated) configured to control or support an access of the first processor 1110 to a shared memory (i.e., memories of any other computing nodes), which is described above.

In an embodiment, the first processor 1110 of the first computing node 1100 may be configured to access the first storage device 1130 based on a given storage interface. Alternatively, the first processor 1110 of the first computing node 1100 may be configured to access the storage devices 1230, 1330, and 1430 of the remaining computing nodes 1200, 1300, and 1400 over the network NT. The interface circuit 1140 may include a network switch (not illustrated) configured to control or support an access of the first processor 1110 to any other storage devices, which is described above. In an embodiment, the storage devices 1130 to 1430 respectively included in the plurality of computing nodes 1100 to 1140 may constitute one RAID volume. Operations of the second to fourth computing nodes 1200 to 1400 may be similar to the operation of the first computing node 1100 described above, and thus, additional description will be omitted to avoid redundancy.

In an embodiment, various applications may be executed at the computing center 1000. The applications may be configured to execute an instruction for data movement or copy between the computing nodes 1100 to 1400 or may be configured to execute instructions for combining, processing, or reproducing a variety of information present on the computing nodes 1100 to 1400. In an embodiment, the applications may be executed by one of the plurality of computing nodes 1100 to 1400 included in the computing center 1000, or the applications may be distributed and executed between the plurality of computing nodes 1100 to 1400.

In an embodiment, the computing center 1000 may be used for high-performance computing (HPC) (e.g., finance, petroleum, materials science, meteorological prediction), an enterprise application (e.g., scale out database), a big data application (e.g., NoSQL database or in-memory replication).

In an embodiment, at least one of the plurality of computing nodes 1100 to 1400 may be an application server. The application server may be configured to execute an application configured to perform various operations at the computing center 1000. At least one of the plurality of computing nodes 1100 to 1400 may be a storage server. The storage server may be configured to store data that are generated or managed at the computing center 1000.

In an embodiment, the plurality of computing nodes 1100 to 1400 included in the computing center 1000 or portions thereof may be present at the same site or at sites physically separated from each other and may communicate with each other over the wireless communication or wired communication based network NT. In an embodiment, the plurality of computing nodes 1100 to 1400 included in the computing center 1000 may be implemented by the same memory technology or may be implemented by different memory technologies.

Although not illustrated in drawing, at least a part of the plurality of computing nodes 1100 to 1400 of the computing center 1000 may communicate with an external client node (not illustrated) over the network NT or over any other communication interface (not illustrated). At least a part of the plurality of computing nodes 1100 to 1400 may automatically process a request (e.g., data store or data transfer) depending on a request of the external client node or may process the request at any other computing node.

In an embodiment, the number of computing nodes 1100 to 1400 included in the computing center 1000 is an example, and the present disclosure is not limited thereto. Also, in each computing node, the number of processors, the number of memories, and the number of storage devices are an example, and the present disclosure is not limited thereto.

In an embodiment, each of the plurality of computing nodes 1100 to 1400 included in the computing center 1000 may be implemented based on the computing system described with reference to FIGS. 1 to 8. Alternatively, a combination of the plurality of computing nodes 1100 to 1400 may be implemented based on the computing system described with reference to FIGS. 1 to 8. In an embodiment, each of the plurality of computing nodes 1100 to 1400 may include the multi-thread accelerator MTA being the base unit of the computing system 100 described with reference to FIGS. 1 to 8. Alternatively, each of the plurality of computing nodes 1100 to 1400 may be implemented through a combination of the multi-thread accelerators MTA each being the base unit of the computing system 100 described with reference to FIGS. 1 to 8.

According to the present disclosure, a general-purpose computing accelerator with improved versatility and improved performance and an operation method thereof are provided.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A computing accelerator for processing multiple-type instructions comprising:
   a memory including an instruction cache and a register;
   a first executing unit configured to perform a first computation operation;
   a second executing unit configured to perform a second computation operation;
   an instruction fetching unit configured to fetch an instruction stored in the instruction cache;
   a decoding unit configured to decode the instruction; and
   a state control unit configured to control a path of the instruction depending on an operation state of the second executing unit,
   wherein the decoding unit provides the instruction to the first executing unit when the instruction is of a first type and provides the instruction to the state control unit when the instruction is of a second type,
   wherein, depending on the operation state of the second executing unit, the state control unit stores the instruction of the second type in the register, and
   wherein, after the instruction of the second type is stored in the register, under control of the state control unit, the instruction fetching unit fetches the instruction of the second type from the register, the decoding unit decodes the instruction of the second type, and the instruction of the second type thus decoded is executed by the second executing unit.

2. The computing accelerator for processing multiple-type instructions of claim 1, wherein the first executing unit includes:
   at least one arithmetic logic unit configured to perform an arithmetic operation or a logic operation; and
   at least one floating point calculating unit configured to perform a floating point operation.

3. The computing accelerator for processing multiple-type instructions of claim 1, wherein the second executing unit includes:
   a multi-precision arithmetic logic unit including a plurality of floating point operators configured to perform a matrix operation; and
   an extended cache direct memory access unit configured to move matrix data from an external memory to an extended cache of the memory.

4. The computing accelerator for processing multiple-type instructions of claim 3, wherein, when the matrix data is stored in the memory by the extended cache direct memory access unit and an operation of the multi-precision arithmetic logic unit is possible, the state control unit provides the instruction of the second type to the multi-precision arithmetic logic unit, and
   wherein the multi-precision arithmetic logic unit performs a matrix operation on the matrix data in response to the instruction of the second type.

5. The computing accelerator for processing multiple-type instructions of claim 3, wherein, when the matrix data is stored in the memory by the extended cache direct memory access unit and the multi-precision arithmetic logic unit is operating, the state control unit stores the instruction of the second type in the register.

6. The computing accelerator for processing multiple-type instructions of claim 3, wherein, when the matrix data is not yet stored in the memory by the extended cache direct memory access unit, the state control unit provides the instruction of the second type to the extended cache direct memory access unit, and
   wherein, in response to the instruction of the second type, the extended cache direct memory access unit moves the matrix data from the external memory to the extended cache of the memory and writes the instruction of the second type in the register.

7. The computing accelerator for processing multiple-type instructions of claim 6, wherein the instruction fetching unit fetches the instruction from the instruction cache based on a program counter.

8. The computing accelerator for processing multiple-type instructions of claim 1, wherein the state control unit includes:
   a determiner configured to generate a first ready signal and a second ready signal based on the operation state of the second executing unit;
   a first selector configured to provide the instruction fetching unit with one of an instruction stored in the instruction cache and an instruction stored in the register file in response to the first ready signal; and
   a second selector configured to provide one of the second executing unit and the memory with the instruction of the second type in response to the second ready signal.

9. The computing accelerator for processing multiple-type instructions of claim 1, wherein a result of the first computation operation of the first executing unit is stored in the memory, and
   wherein a result of the second computation operation of the second executing unit is stored in the memory.

10. The computing accelerator for processing multiple-type instructions of claim 1, wherein the computing accelerator for processing multiple-type instructions is implemented with a single core.

11. An operation method of a computing accelerator for processing multiple-type instructions which includes a memory including an instruction cache and a register, a state control unit, a decoding unit, an instruction fetching unit, a first executing unit configured to perform a first computation operation and a second executing unit configured to perform a second computation operation, the method comprising:
   fetching, by the instruction fetching unit, an instruction from the memory of the computing accelerator, based on a program counter;
   decoding the instruction, by the decoding unit; and
   controlling, by the state control unit, a path of the instruction depending on an operation state of the second executing unit,
   wherein the decoding unit provides the instruction to the first executing unit when the instruction is of a first type and provides the instruction to the state control unit when the instruction is of a second type,
   wherein, depending on the operation state of the second executing unit, the state control unit stores the instruction of the second type in the register, and
   wherein, after the instruction of the second type is stored in the register, under control of the state control unit, the instruction fetching unit fetches the instruction of the second type from the register, the decoding unit decodes the instruction of the second type, and the instruction of the second type thus decoded is executed by the second executing unit.

12. The method of claim 11, wherein the executing of the instruction of the second type through the second executing unit or the storing of the instruction of the second type in the register, based on the operation state of the second executing unit, when the instruction is of the second type includes:
   when matrix data corresponding to the instruction of the second type is not ready in the memory, moving the matrix data from an external memory to the memory and storing the instruction of the second type in the register;
   when the matrix data corresponding to the instruction of the second type is ready in the memory and the second executing unit is incapable of operating, storing the instruction of the second type in the register; and
   when the matrix data corresponding to the instruction of the second type is ready in the memory and the second executing unit is capable of operating, executing the instruction of the second type through the second executing unit.

13. The method of claim 11, wherein a result of the first computation operation of the first executing unit and a result of the second computation operation of the second executing unit are stored in the memory.

* * * * *